United States Patent Office 2,965,506
Patented Dec. 20, 1960

2,965,506

CASTABLE ALUMINUM OXIDE MIXTURE AND ARTICLES MADE THEREFROM

Herbert F. G. Ueltz, Worcester, Mass., assignor to Norton Company, Worcester, Mass., a corporation of Massachusetts No Drawing. Filed Apr. 21, 1958, Ser. No. 729,512

1 Claim. (Cl. 106—64)

The invention relates to castables, that is to say to materials, which, when water is added, will set at room temperature or even lower temperatures to form solids. The invention provides a castable mixture including aluminum oxide. This is a continuation-in-part of my co-pending application, Serial No. 630,012, filed December 24, 1956, now abandoned.

One object of the invention is to provide a refractory castable which is capable of withstanding high temperatures up to about 1760° C. and will be particularly useful and capable of withstanding temperatures in the range of 1550° C. to 1760° C. Another object is to provide a cement for the formation of a concrete of high thermal insulating properties. Another object of the invention is to provide a castable which is mostly aluminum oxide thus obtaining the advantage of its refractoriness, and which is easy to manufacture. Another object of the invention is to provide a castable which will harden quickly. Another object of the invention is to produce a mixture from which a strong concrete can be made. Another object of the invention is to provide a castable material for producing hard concrete. Another object of the invention is to produce a cement mixture which will set into a concrete with only a small shrinkage. Another object is to provide a cement mixture for making concrete of stable characteristics.

Other objects of the invention are to provide a castable cement from which can be made many refractory parts such as the following: kiln, car tops, doors and walls of furnaces, insulating refractories for high temperature chemical reactors and refractory partitions of all kinds. Another object is to provide a castable cement for molding parts in situ, for uniting other refractory articles and for the repair of furnaces and the like.

Other objects will be in part obvious or in part pointed out hereinafter.

My castable comprises aluminum oxide and calcium aluminate. The insulating characteristics of my cement are conferred largely by the relatively thin-walled alumina bubbles which are the primary insulating constituent. These are manufactured by blowing a stream of molten alumina with a gaseous medium such as air. The size of the bubbles that I use is usually in the size range that passes through a No. 4 mesh screen (4 meshes to the inch). Although a small amount of very fine material may be present, most of the bubbles are of a size to be retained on a No. 325 mesh screen. Such a mixture of grit sizes is known as 4F, and a similar product that passes through a No. 6 mesh screen is designated as 6F, etc.

The cementitious ingredient in my mixture consists of a hydraulic setting cement. Ordinary cements are not satisfactory because they are insufficiently refractory. Even high-alumina cements of commercial variety manufactured for high temperature service, are not adequate. I use a calcium aluminate cement of high purity. One such good cement is substantially 18% CaO and 80% $Al_2O_3$, leaving 2.% for impurities. The principal phases are $CaO \cdot 2Al_2O_3$ and $CaO \cdot Al_2O_3$. Free alumina is present. One empirical formula is $CaO \cdot 2.5Al_2O_3$. Lime and alumina can be sintered together according to usual cement manufacturing processes, adapted with particular care to the use of high purity materials and maintenance of purity, and then powdering the sintered product by milling. The molar ratio of alumina divided by lime should be greater than 1.5 in the cement.

Calcium oxide is an alkaline earth oxide as is likewise magnesium oxide. These two oxides are associated together in raw materials, and magnesium oxide is usually an impurity in the cement along with other common impurities such as oxides of sodium, iron and silicon. However, the aluminum oxide content plus the alkaline earth oxide content should constitute at least 95% of its composition in order to produce the highly refractory product of this invention, and preferably 97.% to 98.% or more.

Within the scope of my invention other calcium aluminate cements may be employed if they have the requisite purity and set up with adequate strength. Impurities should be low, and it is not advisable to have significantly more than 3% present. Iron oxide is the commonest fluxing impurity to be avoided and should not exceed 2.%.

Calcium aluminate reacts with water to produce a hard cementitious mass. It has a very good affinity for aluminum oxide and adheres to it strongly thus producing a strong conrete. Aluminum oxide is a hard crystalline material having a hardness of 9 on Mohs' scale.

For best results I use, for the aluminous materials component, some of the dense form of alumina in addition to the bubbles. This may be in the form of sizes ranging from coarse to fine such as 14 mesh and finer, or entirely in a fine grain size such as 200 mesh and finer. One way to obtain such alumina is to crush alumina bubbles before adding them to the mixture. Another way is to employ sintered material such as tabular alumina. Another way is to use fused and crushed refractory alumina grain of the desired sizing and purity. I designate this type of alumina under the generic name of "dense alumina," as distinguished from bubbles.

The bubble alumina should be relatively pure. Impurities and combinations of impurities that lower deformation temperatures of the refractory concrete down to those of cheaper cements and materials are not desirable. In general, chemical $Al_2O_3$ contents of 95% or more for the bubbles are desired and a similar statement can be made about dense alumina employed in the mixture. For some products alumina purity of 97% is advantageous and this may be even increased to 98.% to 99.% in specific cases.

The alumina bubbles present in the mixture which are the primary insulating constituent, should be present in a volume amount that conveys desirable insulating characteristics to the concrete produced. Obviously, the weight of bubbles occupying a given volume will depend not only on the degree of packing of the bubbles, but also on the amount of pore space present in the bubbles, which is largely a function of the bubble wall thickness. Thus, for bubbles in general, the weight proportions that are used in the mixtures, will depend in detail on the characteristics of the particular bubbles being employed. A given weight of thin walled bubbles will occupy a much greater volume proportion of the product than when the bubble walls are thick. The volume proportions will also depend on the size distribution of the bubbles. In general, more than 40 volume percent of the concrete should be composed of the bubble constituent.

A good formula for my mixture is:

Table I

Fused alumina bubbles ___ 50 percent by weight.
Tabular alumina 14F _____ 13 percent by weight.
Tabular alumina 48F _____ 12 percent by weight.
Calcium aluminate _____ 18% CaO, 80% $Al_2O_3$, 25 percent by weight.

A large quantity of concrete has already been made out of the mixture of Table I.

In the above table, 14F means 14 mesh grit size and finer particles and 48F means 48 mesh grit size and finer particles. These designations are also well known.

This mixture, when mixed with water, in variable amounts to produce the desired consistency, can be poured into molds of a wide variety of shapes, and will harden within 24 hours to a concrete which can be dried, and which will show superior performance as a refractory up to about 1760° C. The concrete has low shrinkage and has stable characteristics.

Typical curing of the concrete can be obtained by covering the freshly poured product with moist rags, and allowing to stand for 24 hours, following which the concrete is allowed to mature by air drying for another 24 hours or more at around room temperature. The exact times will depend on various factors such as the particular calcium aluminate employed, the size and shape of the cast concrete piece, etc.

Concrete made from my cement is refractory. The melting point of pure alumina is by latest determinations 2015° C.±15° C. Calcium aluminate cements soften at somewhat lower temperatures, such as 1765° C. One composition of concrete made from the castable mixture of Table I has a calculated liquidus temperature of above 1900° C. but below the melting point of alumina.

Table II gives the thermal conductivity of the Table I concrete at various temperatures in B.t.u. per hour per square foot per inch per degree Fahrenheit:

Table II

| Mean Temperature, °F. | Thermal Conductivity, B.t.u./hr./sq. ft., inch/°F. |
|---|---|
| 858 | 7.42 |
| 1,234 | 6.55 |
| 1,579 | 6.15 |

Because of the content of alumina bubbles, thermal conductivity of the concrete is low which is a desirable characteristic of my product. But thin walled alumina bubbles have a low crushing strength especially in coarser grain sizes. I have found that concrete made only from them in the uncrushed form with calcium aluminate has a lower strength than often desired. I have discovered, however, that by means of the addition of dense alumina particles I can greatly increase the strength of the cast pieces of concrete and this is surprising.

Table III gives a comparison of the modulus of rupture of two pieces of concrete, the first concrete being made in accordance with Table I, the second being made from 75% alumina bubbles, the remainder calcium aluminate.

Table III

| Concrete | Modulus of Rupture, Pounds per Square Inch |
|---|---|
| (1) Concrete of Table I Mixture | 605 |
| (2) Concrete of 75% Alumina Bubbles, 25% calcium aluminate | 250 |

Concrete (1) had 50% by weight of fused alumina bubbles of grit size 6F. Concrete (2) had 75% of fused alumina bubbles of grit size 6F. Both concretes had 25% calcium aluminate and all percentages are by weight. The above concretes were otherwise prepared in the same way and allowed to set under the same conditions for the same length of time. The specimen size was bars 9 x ¾ x 2¼", broken flatwise on an 8" span with single point loading, the rate of loading being about 200 pounds per square inch increase of stress per minute and the results being calculated to modulus of rupture by the simple cross-bending formula. The exact values for modulus of rupture will depend on the particular batch of calcium aluminate cement that is employed, but dried cured products are desired that will have a modulus of rupture greater than 200 pounds per square inch, and 300 pounds per square inch is still more satisfactory as a minimum desired value.

Another excellent characteristic of concrete made from my castable mixture is low shrinkage. Concrete made from the mixture of Table I had a linear shrinkage of only about .15% when heated up to 1000° C.

In studying these shrinkages at 1760° C., the product was cast as 9 x 2¼ x ¾" rectangular bars as previously described. After measuring the length accurately, the bars were set on edge in a small gas-fired kiln with #46 grit #38 Alundum grain as setting medium. The kiln was raised to 1760° C. (3200° F.) measured with an optical pyrometer sighted on the specimens. Soaking time at temperature was 4 hours, after which the kiln was cooled to room temperature and the specimens again measured to determine the linear percent shrinkage which was less than 1% and represents a satisfactory product for high temperature use in the range 1550° C. to 1760° C.

In using my castable mixture the dry material is mixed with clean water either by hand in a concrete mixing trough, or in a standard concrete mixer. The amount of water used is about 18.5% by weight based on the weight of dry material. This is somewhat variable so it is suggested that only a portion of the water be added at first, the remainder being added slowly until a relatively quick increase in fluidity is noted. The pouring consistency of the mixture should be about like that commonly used for Portland cement mixtures. If the castable mixture is too dry, it will lead to voids and cracks, whereas if the mixture is too wet, segregation of the coarse grains will take place. Mixing should take only long enough for a uniform mixture to result (above five minutes in a concrete mixer).

The wet concrete mix should be poured into pre-erected forms. If possible, the whole quantity of castable should be mixed at one time and poured quickly. If this is not possible, successive batches should be made and poured immediately, blending the top surface of the previous pour by churning it up with a stick as the new pour is added. As the wet castable is being poured, it should be agitated with a wooden pole to work the air pockets out. After pouring is completed, the top surface may be troweled smooth.

Other properties measured for a castable aluminum oxide mixture made according to Table I are as follows:

Optimum moisture content=About 18.5% based on weight of dry material.
Density and linear shrinkage:

| | Density | | Linear Shrinkage vs. Dimensions of Mold, percent |
|---|---|---|---|
| | Gm./cc. | Lbs./cu. ft. | |
| As Cast and Dried at Room Temperature (Cylinders about 1 ft. high x 1 ft. diam.) | 1.64 | 102 | Zero |
| Initial Firing to 1,400° C | 1.57 | 98 | .25 |
| Initial Firing to 1,725° C | 1.58 | 99 | .40 |

Setting time:
  Begins to stiffen within one hour,
  Initial set in four hours,
  Final set in fourteen to twenty-four hours.

Calculated chemical analysis of final product in use:

| | Percent |
|---|---|
| $Al_2O_3$ | 95.00 |
| $SiO_2$ | 0.04 |
| $Fe_2O_3$ | 0.13 |
| $TiO_2$ | 0.02 |
| $Na_2O$ | 0.22 |
| $MgO$ | 0.10 |
| $CaO$ | 4.50 |
| | 100.00 |

Estimated maximum usable temperature for installations having one hot exposed surface:

| 3,300° F. | (1,815° C.) |
|---|---|

Modulus of rupture after heating (measured at room temperature):

| Firing temperature, ° C. | Modulus of rupture, p.s.i. |
|---|---|
| As cast | 730 |
| 200 | 650 |
| 400 | 580 |
| 600 | 540 |
| 800 | 460 |
| 1000 | 420 |
| 1200 | 420 |
| 1400 | 760 |
| 1725 | 1000 |

Linear shrinkage after heating:

| Firing temperature, ° C. | Percent linear shrinkage |
|---|---|
| As cast | None |
| 200 | 0.10 |
| 400 | 0.15 |
| 600 | 0.20 |
| 800 | 0.18 |
| 1000 | 0.15 |
| 1200 | 0.20 |
| 1400 | 0.25 |
| 1725 | 0.40 |
| 1815 | 2.34 |

Calculated total volume percent pores of product after firing=About 58 volume percent.

Reheat shrinkage at 3200° F. (1760° C.):

| | Percent linear shrinkage |
|---|---|
| First 3200° F. firing | 0.60 |
| Second 3200° F. firing | 10.14 |
| Total shrinkage, both 3200° F. firings | 0.74 |

[1] Based on length after first firing.

There is no necessary requirement that the bubble sizing has to meet. I have used #6 mesh and finer, described previously as 6F, one major reason being that it is desirable to remove coarse irregular particles that are often not thin walled bubbles in the raw bubble product as manufactured. This 6F sizing represents minimum cost material since substantially the entire bubble production is utilized. On the other hand, finer sizes of bubbles make better insulating products, smoother surfaces, and higher strengths. To achieve these advantages bubble sizes such as 46F, 100F, etc., can be employed, and for such products, it is usually good practice to use dense alumina of which the coarsest grains are no coarser than the coarsest bubbles employed.

It will thus be seen that there has been provided by this invention a castable aluminum oxide mixture in which the various objects hereinabove set forth together with many thoroughly practical advantages are successfully achieved. As many possible embodiments may be made of the above invention and as many changes might be made in the embodiments above set forth, it is to be understood that all matter hereinbefore set forth is to be interpreted as illustrative and not in a limiting sense.

I claim:

A castable mixture essentially consisting of fused alumina bubbles about 50% by weight, dense alumina 14F size and 48F size a total of about 25% by weight with a substantial amount as large as 14 mesh size, and calcium aluminate about 18% CaO and 80% $Al_2O_3$ about 25% by weight.

References Cited in the file of this patent

UNITED STATES PATENTS

| 1,682,675 | Horsfield | Aug. 28, 1928 |
| 2,246,226 | Walton | June 17, 1941 |
| 2,340,194 | McMullen | Jan. 25, 1944 |
| 2,407,135 | Clark | Sept. 3, 1946 |
| 2,527,500 | Norton et al. | Oct. 24, 1950 |
| 2,874,071 | Kadisch et al. | Feb. 17, 1959 |